(12) United States Patent
Harindranath

(10) Patent No.: US 8,160,060 B2
(45) Date of Patent: Apr. 17, 2012

(54) SYSTEM AND METHOD FOR TRANSFERRING DATA USING VARIANCE BASED MESSAGING

(75) Inventor: Rajmohan Harindranath, Palakkad District (IN)

(73) Assignee: Infosys Technologies Limited, Bangalore (IN)

( * ) Notice: Subject to any disclaimer, the term of this patent is extended or adjusted under 35 U.S.C. 154(b) by 570 days.

(21) Appl. No.: 12/319,183

(22) Filed: Jan. 2, 2009

(65) Prior Publication Data
US 2010/0118770 A1 May 13, 2010

(30) Foreign Application Priority Data

Nov. 10, 2008 (IN) .......................... 2753/CHE/2008

(51) Int. Cl.
*H04L 12/66* (2006.01)
*H04L 12/56* (2006.01)
*H04J 3/12* (2006.01)
*H04M 1/64* (2006.01)

(52) U.S. Cl. ........ 370/352; 370/392; 370/471; 370/474; 379/88.22

(58) Field of Classification Search .......... 370/351–352, 370/389, 392–393, 400–401, 471, 473–475, 370/535–544; 709/238, 244–245
See application file for complete search history.

(56) References Cited

U.S. PATENT DOCUMENTS

| 5,579,316 | A | * | 11/1996 | Venters et al. ................. 370/392 |
| 5,822,523 | A | | 10/1998 | Rothschild et al. |
| 5,995,511 | A | * | 11/1999 | Zhou et al. ..................... 370/412 |
| 6,088,354 | A | * | 7/2000 | Lenell et al. ................... 370/389 |
| 6,952,411 | B2 | | 10/2005 | Sinnarajah et al. |
| 7,136,377 | B1 | | 11/2006 | Tweedly et al. |
| 7,403,497 | B2 | | 7/2008 | Miao |
| 2003/0118051 | A1 | * | 6/2003 | Ooms ........................... 370/471 |
| 2006/0104303 | A1 | | 5/2006 | Makineni et al. |
| 2007/0211682 | A1 | * | 9/2007 | Kim et al. ..................... 370/338 |
| 2008/0089357 | A1 | * | 4/2008 | Park et al. ..................... 370/465 |
| 2008/0267217 | A1 | * | 10/2008 | Colville et al. ............... 370/477 |

* cited by examiner

*Primary Examiner* — Tri H Phan
(74) *Attorney, Agent, or Firm* — Lerner, David, Littenberg, Krumholz & Mentlik, LLP

(57) ABSTRACT

A system and method for providing data transfer from a source node to a destination node in a network using variance based messaging is provided. The method comprises the steps of receiving one or more messages by the source node; selecting a plurality of messages to be grouped from the one or more messages, wherein the plurality of messages comprise data with minimum deviation in content; creating an integrated message from the plurality of messages; sending the integrated message from the source node to the destination node; and recreating each message of the plurality of messages at the destination node.

22 Claims, 9 Drawing Sheets

SYSTEM AND METHOD FOR TRANSFERRING DATA USING VARIANCE BASED MESSAGING

BACKGROUND OF THE INVENTION

The present invention is directed towards transferring data in a network. More particularly, the present invention provides efficient data transfer in a network using variance based messaging.

Data transfer within a network generally involves transfer of packets between nodes in the network. A packet is a formatted block of digital data storing an information message. Closed networks like telephony networks have significantly lesser number of nodes as compared to large scale networks, such as the Internet. However, messaging (data transfer) between any two nodes in a telephony network is considerably higher due to a large number of messages being exchanged to create and tear down voice and data calls.

In a telephony network, more than 80% of data transfer between the nodes comprise messages for setting up and tearing down basic voice calls. The messaging required for the basic voice calls are very similar in nature i.e. the messages transferred between nodes to set up and tear down basic voice calls have minor differences like differences in the called party address, calling party address etc. For example, messages for setting up a call between node A and node B and another call between node C and node D would be very similar with the called party address and calling party address being the only difference between them. Similarly, messaging for taking down these calls again would be very similar with each other. Due to small variation of data in the messages related to voice calls, a lot of redundant information is sent. Further, headers transferred in the messages causes a significant wastage of bandwidth in telephony networks due to transfer of redundant information. This results in a reduction in bandwidth utilization efficiency of the computer network supporting the telephony system.

Consequently, there is need for a system and a method for transferring data in a network efficiently. Such efficiency in data transfer would result in improvement in the bandwidth utilization efficiency of the network.

BRIEF SUMMARY OF THE INVENTION

A method for transferring data in a network using variance based messaging is provided. The method comprises a step of first receiving one or more messages to be sent by a source node.

In an embodiment of the present invention, data is transferred from the source node to a destination node using variance based messaging by grouping the messages to be sent together. The method comprises a step of selecting a plurality of messages to be grouped from the one or more messages. Thereafter, an integrated message from the grouped messages is created and the integrated message is sent from the source node to the destination node. At the destination node, each message of the plurality of messages is recreated.

In an embodiment of the present invention, the step of creating an integrated message comprises firstly creating a common payload area in the integrated message. Secondly, data common to the plurality of messages is stored in the common payload area. Thirdly, a header block is created in the integrated message and fourthly a plurality of header elements corresponding to each message is inserted in the integrated message.

In an embodiment of the present invention, data is transferred from the source node to a destination node using variance based messaging by sending an initial template message having data common to the messages to be sent. Thereafter, a plurality of delta messages corresponding to individual messages are sent. The plurality of delta messages include data unique to the messages to be sent.

BRIEF DESCRIPTION OF THE DRAWINGS

The present invention is described by way of embodiments illustrated in the accompanying drawings wherein.

DETAILED DESCRIPTION

A method and a computer program product for transferring data in a network are described herein. The present disclosure is more specifically directed towards providing efficient data transfer in a network using variance based messaging. An exemplary scenario in which the present invention may be implemented is a telephony network wherein similar messages are transferred between user equipments in the network. Transfer of data between mobile devices in a telephony network involves the transfer of a significant number of messages with minimal deviation in content. Such a transfer of similar messages is caused due to a large number of basic voice calls being set up between mobile devices in a telephony network.

In an embodiment of the present invention, the system, method and computer program product disclosed provides efficient data transfer between mobile devices in a network by grouping the messages to be transferred in an integrated message and sending the integrated message.

In another embodiment of the present invention, the system, method and computer program product disclosed provides efficient data transfer between mobile devices in a network by sending an initial template message having common data first and then sending individual message with data in variance to the common data.

Hence, the present invention enables efficient use of network bandwidth by limiting the amount of redundant data transferred in the network. The present invention also enables an increase in capacity at destination nodes by reducing the time required for processing the data received.

The disclosure is provided in order to enable a person having ordinary skill in the art to practice the invention.

Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
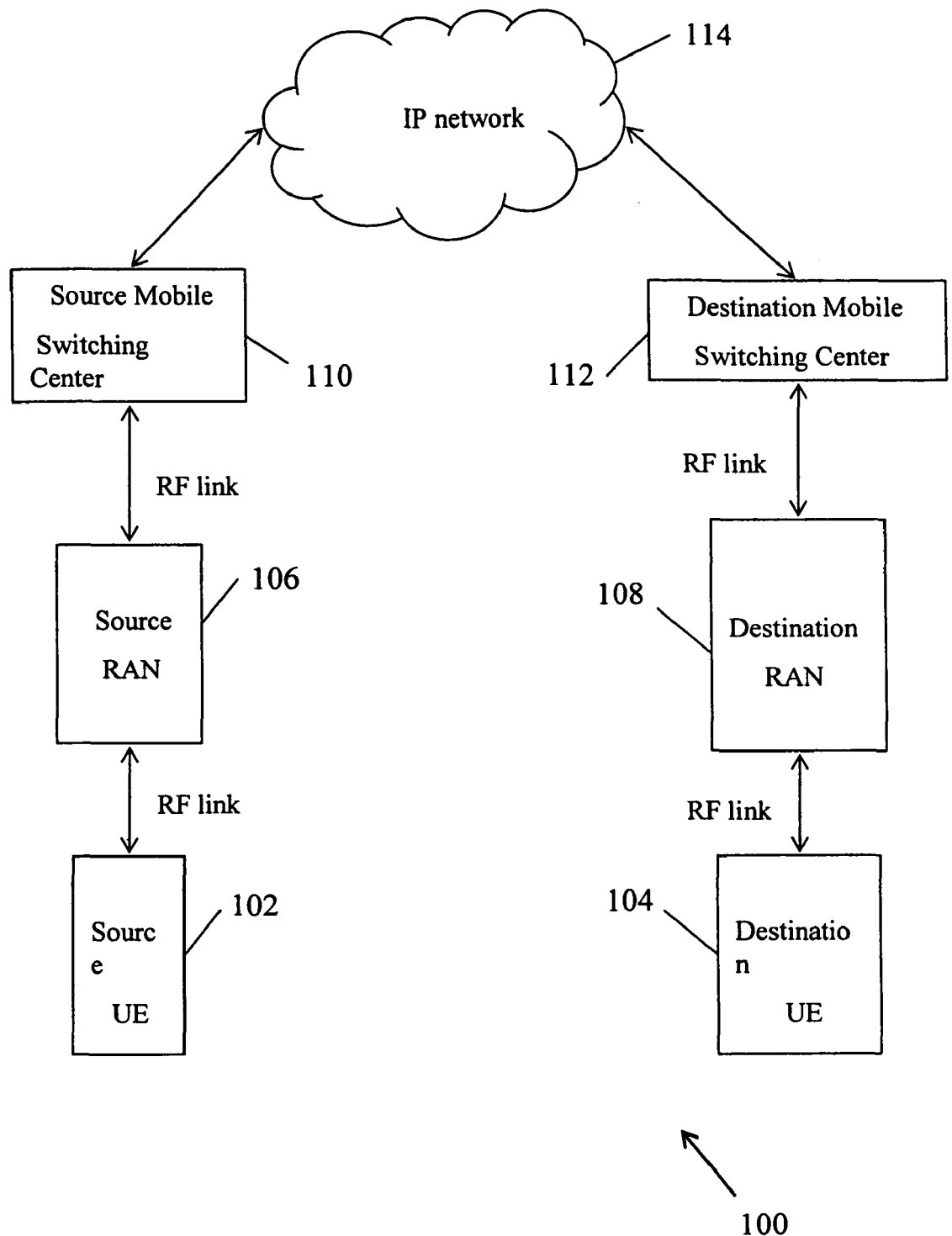
FIG. 1 illustrates an exemplary network supporting a telephony system for transfer of messages between electronic communication devices.

FIG. 1 illustrates an exemplary network 100 supporting a telephony system for transfer of messages between electronic communication devices. An IP telephony system is a network-based transmission of voice and data services between wireless or wired devices in a packet-switched format. The telephony signals used in the transmission of voice and data services are in the form of digital signals encapsulated in data packets conforming to IP protocol standards. In an IP telephony system, any voice or data message to be transmitted is segmented into small parts called packets. Each packet is labeled with a destination identifier and a packet identifier. Each packet is then routed through the network in a connectionless format i.e. each packet may take a different route to reach the same destination node. At the destination node, packets belonging to the same message are reassembled to recreate the original message.

In an embodiment of the present invention, the network 100 comprises a source User Equipment (UE) 102, a destination User Equipment (UE) 104, a source Radio Access Network (RAN) 106, a destination Radio Access Network (RAN) 108, a source Mobile Switching Center (MSC) 110, and a destination Mobile Switching Center (MSC) 112. UE 102 may be an electronic communication device configured to operate in the network 100. Examples of a UE include but are not limited to electronic devices like mobile phones, personal digital assistants, wireless radios, Global Positioning System (GPS) devices, and wireless computing devices. MSCs 110, 112 are switching units in the network 100 that work in operation with the RAN 106 to generate switching and signaling information for transferring messages between the source UE 102 and the destination UE 104. The source UE 102 is wirelessly connected to the source MSC 110 through the source RAN 106 and the destination UE 104 is wirelessly connected to the destination MSC 112 through the destination RAN 108. The source RAN 106 is a component of the network 100 that is used for providing the source UE 102 with physical access to a switching unit so that the source UE 102 can communicate with the destination UE 104 in the network. Examples of a RAN include but are not limited to, a GSM network, a UMTS network, and a CDMA network. The source RAN 106 provides the source UE 102 with physical access to the source MSC 110 via a Radio Frequency (RF) link.

In various embodiments of the present invention, the source MSC 110 communicates with the destination MSC 112 through the IP network 114 to transfer messages between the source UE 102 and the destination UE 104. In an embodiment the signaling information generated by the source MSC 110 comprises control information for setting up calls between the source UE 102 and the destination UE 104 and other call management services. An example of the signaling protocol used by the source MSC for generating the signaling information is Common Channel Signaling 7 (CCS7) protocol.

Figure 2:
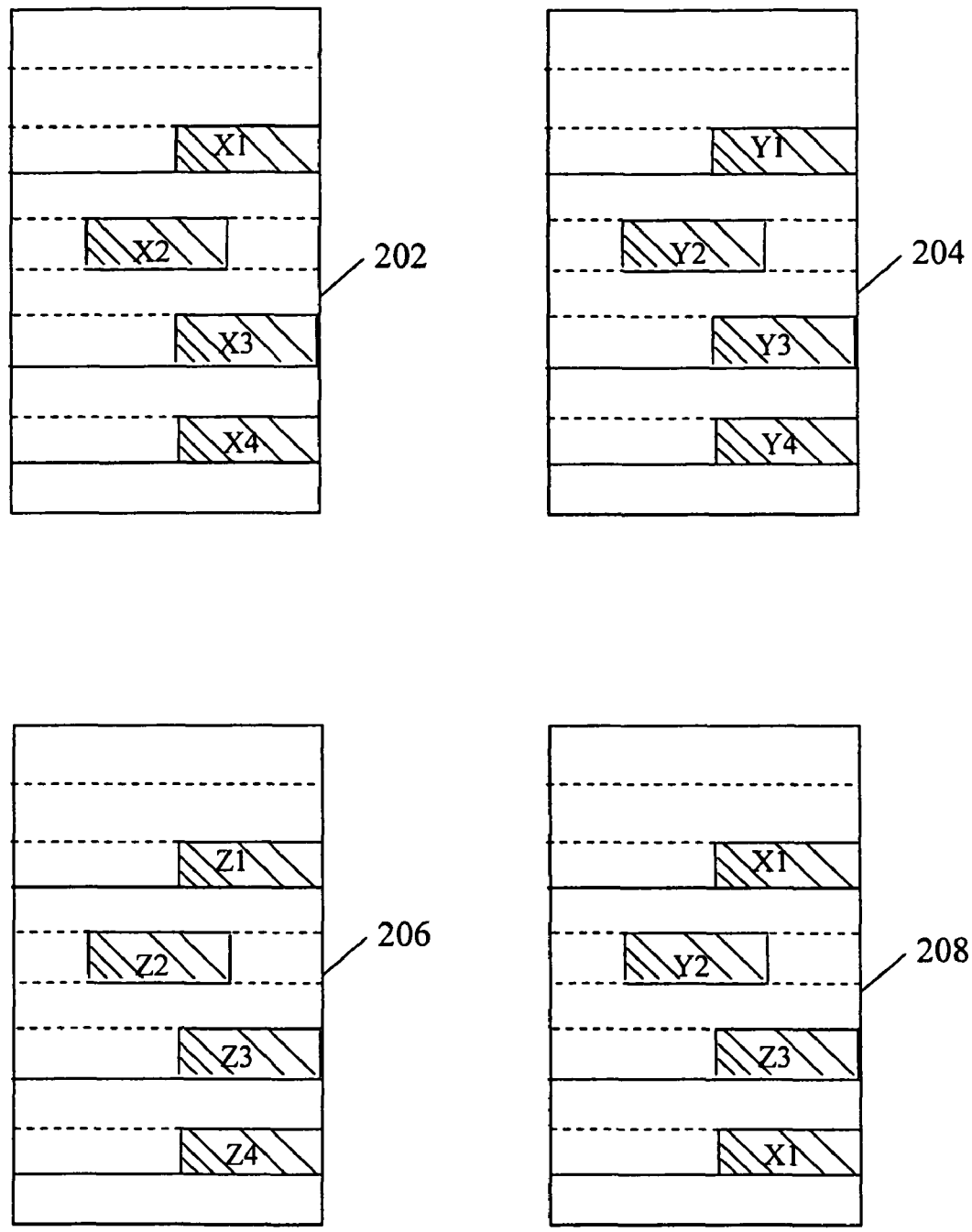
FIG. 2 illustrates a set of messages exchanged in a telephony network as part of a single voice call.

FIG. 2 illustrates a set of messages exchanged in a telephony network as part of a single voice call. In an embodiment of the present invention, a set of four messages 202, 204, 206, and 208 are messages exchanged as part of a single voice call. The messages 202, 204, 206, and 208 are exchanged through the IP network 114 (FIG. 1). For example, the messages 202, 204, 206, and 208 may be messages sent from an MSC to a Base Station Subsystem (BSS). In other examples, the messages exchanged within a network may include but are not limited to, messages exchanged between an MSC and database nodes, messages between two MSCs, and messages between an MSC and bearer nodes. In an embodiment of the present invention, the messages 202, 204, 206, and 208 may be messages sent from the source MSC 110 (FIG. 1) to the destination MSC 112 (FIG. 1). Examples of messages sent include but are not limited to, signaling messages for call establishment, mobility management, registration and location update. In an embodiment of the present invention, the messages 202, 204, 206, and 208 are messages with minimal deviation in content. Examples of content that may be dissimilar between the messages include but are not limited to, parameters like calling address and called address. The parameters X1, X2, X3, and X4 in the message 202, the parameters Y1, Y2, Y3, and Y4 in the message 204, the parameters Z1, Z2, Z3, and Z4 in the message 206 and the parameters X1, Y2 and Z3 in the message 208 are in variance to common data in the messages 202, 204, 206, and 208.

Figure 3:
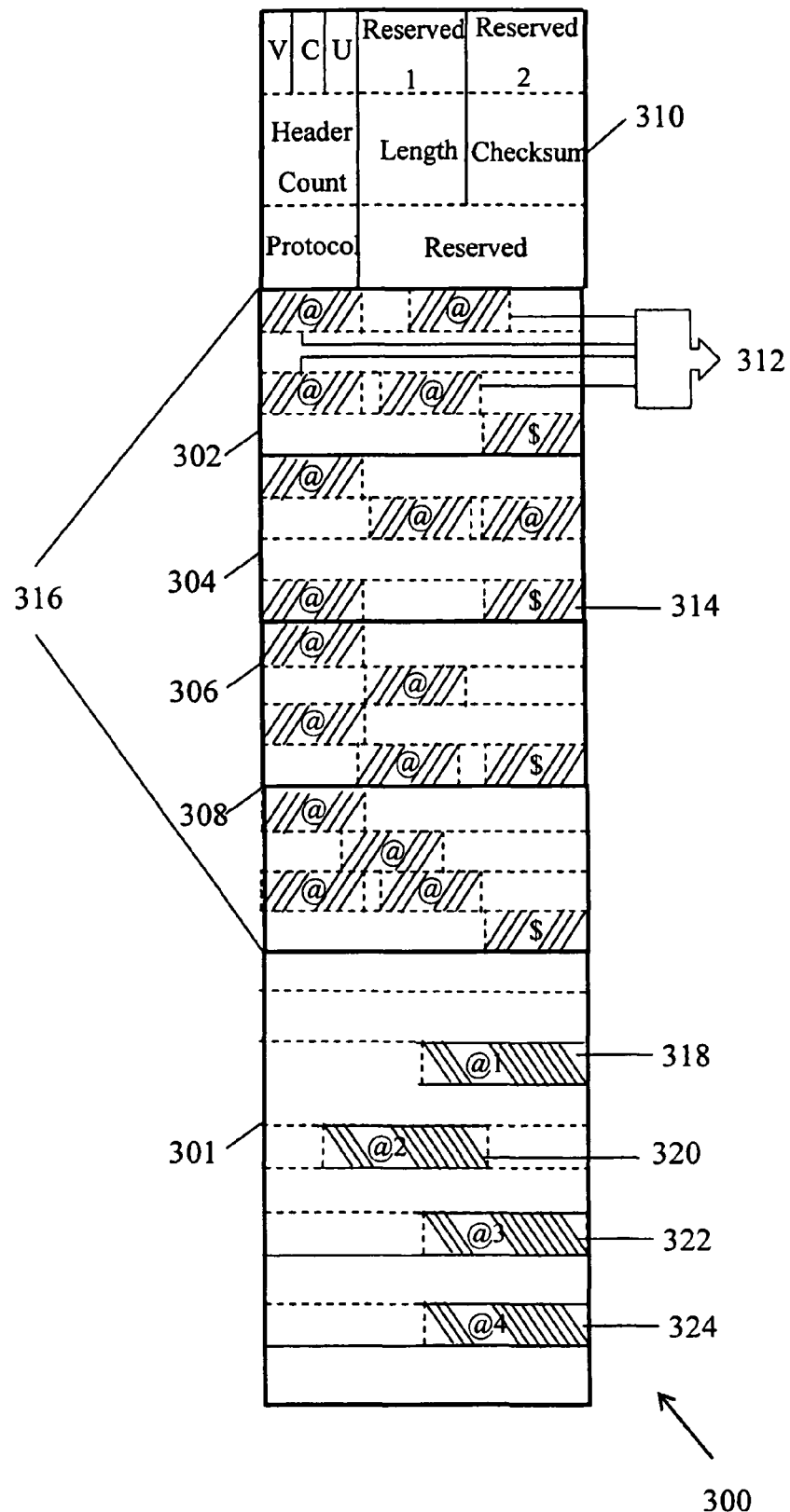
FIG. 3 illustrates an integrated message exchanged between a source MSC and a destination MSC in a telephony network using variance based messaging in the modifiable differentials mode.

FIG. 3 illustrates an integrated message 300 exchanged between a source MSC and a destination MSC in a telephony network using variance based messaging in the modifiable differentials mode. In an embodiment of the present invention, with reference to FIG. 2 and FIG. 1, the messages 202, 204, 206, and 208 are sent from the source MSC 110 to the destination MSC 112 using variance based messaging in the modifiable differentials mode. The messages 202, 204, 206, and 208 are grouped and sent together instead of sending them independently. An integrated message 300 is created using the messages 202, 204, 206, and 208. The integrated message 300 comprises a common payload area having data common to the messages 202, 204, 206, and 208. Further, the integrated message 300 comprises header elements having data corresponding to the messages 202, 204, 206, and 208 that is in variance to the common data. In an embodiment of the present invention, the integrated message 300 is sent from the source MSC 110 (FIG. 1) to the destination MSC 112 (FIG. 1) through the IP network 114 (FIG. 1). At the destination MSC 112, the integrated message 300 is decoded to recreate the messages 202, 204, 206, and 208.

The integrated message 300 comprises a common payload area 301, a variance based protocol header 310, and a variance based protocol header block 316. The common payload area 301 comprises data common to the messages 202, 204, 206, and 208. The variance based protocol header block 316 comprises a first header element 302, a second header element 304, a third header element 306, and a fourth header element 308. The header elements 302, 304, 306, and 308 comprise data in the messages 202, 204, 206, and 208 respectively which is in variance to the common data in the common payload area 301. For example, the first header element 302 comprises a set of parameters 312 that represent the parameters X1, X2, X3, and X4 in the message 202. Similarly, the second header element 304 comprises a set of parameters that represent the parameters Y1, Y2, Y3, and Y4 in the message 204. Each header element comprises a parameter that signifies the end of data stored in the header element. For example, the parameter 314 in the first header element 302 signifies the end of data stored in the first header element 302. The common payload area 301 comprises the reference pointers 318, 320, 322, and 324. The reference pointers 318, 320, 322, and 324 are references to data in the header elements 302, 304, 306, and 308 that is in variance to the common data in the messages 202, 204, 206, and 208. For example, the reference pointer 318 references the set of parameters 312 in the first header element 302 that represent the parameters X1, X2, X3, and X4 in the message 202. Similarly, the reference pointer 320 references the parameters Y1, Y2, Y3, and Y4 in the message 204. In an embodiment of the present invention, at the destination MSC 112 (FIG. 1), data in the common payload area 301 along with data in the header elements 302, 304, 306, and 308 is used to recreate the messages 202, 204, 206, and 208.

In various embodiments of the present invention, the variance based protocol header 310 is a portion of the integrated message 300 that stores control information used in reliable transfer of messages between the source MSC 110 (FIG. 1) and the destination MSC 112 (FIG. 1). The variance based protocol header 310 comprises the following sections: 'V', 'C', 'U', Reserved-1, Reserved-2, Length, Header Count, Checksum, Protocol, and Reserved. The section 'V' is a 4-bit wide section signifying the variance based protocol version of the integrated message 300. The section 'V' can have any value between "0000" to "1111". For example, for a message conforming to the first version of the variance based protocol, the section 'V' may have the value "0000". The section 'C' is 2-bit wide section signifying the type of checksum used for checking the integrated message 300. A checksum is additional data added to a message transferred in an IP network to detect errors in the data transferred at the destination node. An example of checksum may be adding the bits of data stored in the message and storing the resulting value as additional data before sending the message. At the destination node, similar addition is performed on the stored message and the result is compared to the checksum to ensure receipt of correct data. A value 'C' for the checksum signifies that no checksum is used for the integrated message 300. A value of '01' or '10' for 'C' signifies that a checksum is used with the integrated message 300. A value of '01' signifies that a single checksum is used for the entire integrated message 300. In various embodiments of the present invention, an 8-bit checksum is used for the integrated message 300, which is included at the end of the message. A value of '10' signifies that individual checksums are used for each of the header elements and for the common payload area. In this case, 8-bit checksums are added at the end of each header element and at the end of payload area. A value of '00' signifies no checksum used and a value of '11' signifies 'reserved/unused'. The section 'U' is a 2-bit section signifying the mode of usage of variance based messaging in transferring messages within the network. A value '00' signifies that 'Modifiable Differentials Mode' is used whereas a value '01' signifies that 'Delta Messaging Mode' is used. As explained in the description of FIG. 3, in the 'Modifiable Differentials Mode', messages to be transferred are grouped together and an integrated message is created. The integrated message comprises a common payload area having data common to the messages to be sent. In addition, the integrated message comprises individual header elements corresponding to unique data in each individual message. The section 'Reserved-1' is a 16-bit wide section which is used by a software application running at the source MSC 110 (FIG. 1) to provide data to the destination MSC 112 (FIG. 1) for better processing of a message sent. The section 'Reserved-2' is unused as per the current version of variable messaging. The section 'Length' is a 16-bit wide section that specifies the length in octets of the entire integrated message 300. The section 'Header Count' is an 8-bit wide section that indicates the number of headers in the integrated message 300. In an example, at the destination node, the section 'Header Count' indicates the number of individual messages incorporated in the integrated message 300. The section 'Checksum' is an 8-bit wide section that comprises checksum for the variance based protocol header 310. The section 'Protocol' describes the application protocol over which 'Variance Based Messaging' has been incorporated. This section may be used at the destination MSC 112 to apply protocol-specific behavior to the integrated message 300.

Figure 4:
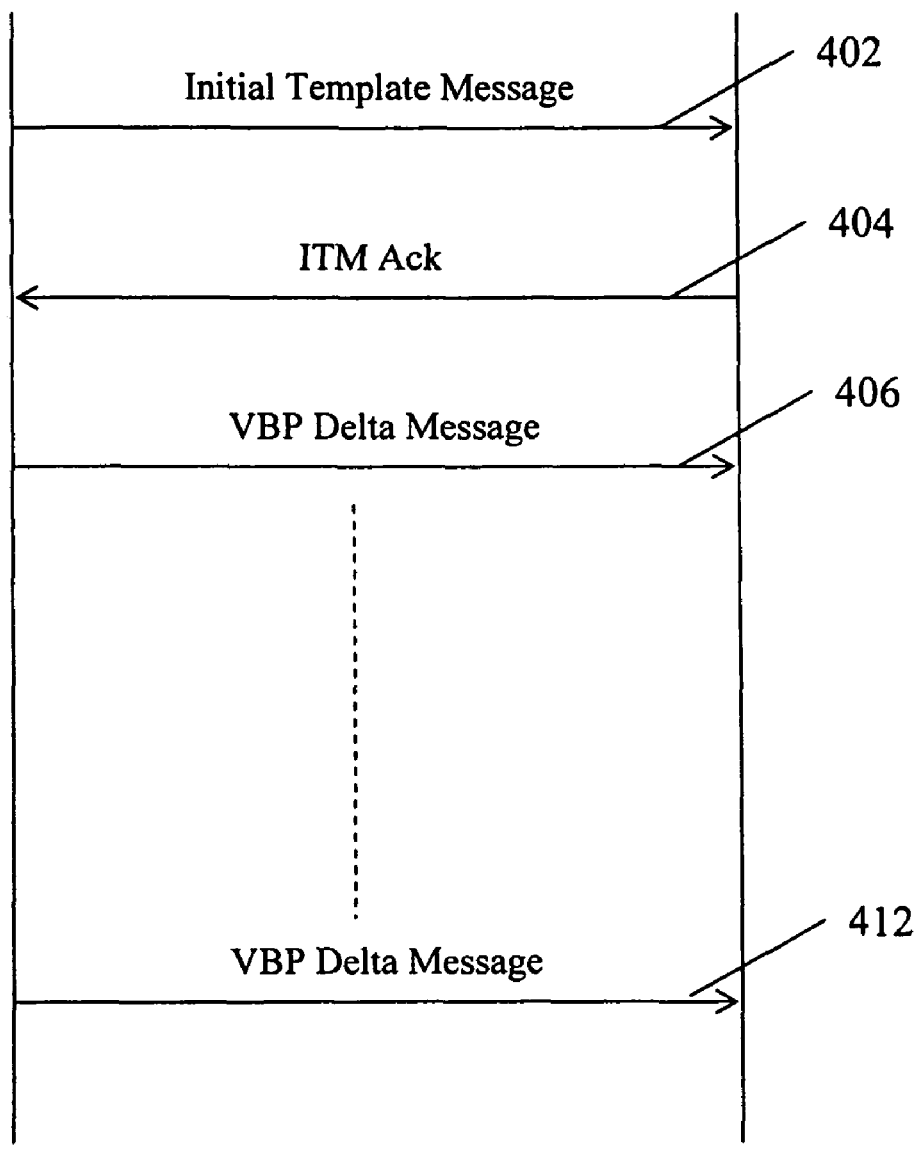
FIG. 4 illustrates message flow in a network using variance based messaging system for transferring data in the delta messaging mode.

FIG. 4 illustrates message flow in a network using variance based messaging system for transferring data in the delta messaging mode. With reference to FIG. 2 and FIG. 1, in an embodiment of the present invention, the messages 202, 204, 206 and 208 are transferred between the source MSC 110 and the destination MSC 112 using variance based messaging in the delta messaging mode. In various embodiments of the present invention, the messages 202, 204, 206, and 208 are not grouped together. However, data common to the messages is included in a common payload message and is sent first. Thereafter, data in variance to the common data is sent separately in individual messages corresponding to each message. As shown in FIG. 4, an initial template message 402 is first sent from the source MSC 110 (FIG. 1) to the destination MSC 112 (FIG. 1). The initial template message 402 comprises data common to the messages 202, 204, 206, and 208. For example, the initial template message 402 comprises data excluding the parameters X1, X2, X3, and X4 in the message 202, the parameters Y1, Y2, Y3, and Y4 in the message 204, the parameters Z1, Z2, Z3, and Z4 in the message 206, and the parameters X1, Y2, and Z3 in the message 208. In an embodiment of the present invention, a software application may be used in creating the initial template message 402. In an embodiment of the present invention, a transaction identifier is included in the initial template message 402 before sending it to the destination MSC 112 (FIG. 1). An acknowledgement for receipt of the initial template message 402 is sent by the destination MSC 112 (FIG. 1) and received by the source MSC 110 (FIG. 1). In an embodiment of the present invention, the transaction identifier of the initial template message is included in the acknowledgement message so that the source MSC 110 (FIG. 1) is able to associate the acknowledgement message with the initial template message. The source MSC 110 (FIG. 1) then sends four Variance Based Protocol (VBP) delta messages 406-412 to the destination MSC 112 (FIG. 1) corresponding to the messages 202, 204, 206, and 208 (FIG. 2) respectively. In an embodiment of the present invention, a VBP delta message corresponding to a message is created using a software application at the source MSC 110 (FIG. 1). The software application may scan the messages 202, 204, 206, and 208 (FIG. 2) and then create a VBP message to be sent corresponding to each message. In various embodiments of the present invention, a VBP message comprises a header element including parameters unique to a message. For example, the VBP delta message 406 corresponding to the message 202 comprises a header element including the parameters X1, X2, X3, and X4 (FIG. 2). Similarly, the VBP delta message 412 corresponding to the message 204 comprises a header element including the parameters Y1, Y2, Y3, and Y4 (FIG. 2). The structure of a VBP message will be explained in detail in conjunction with the explanation corresponding to FIG. 5.

Figure 5:
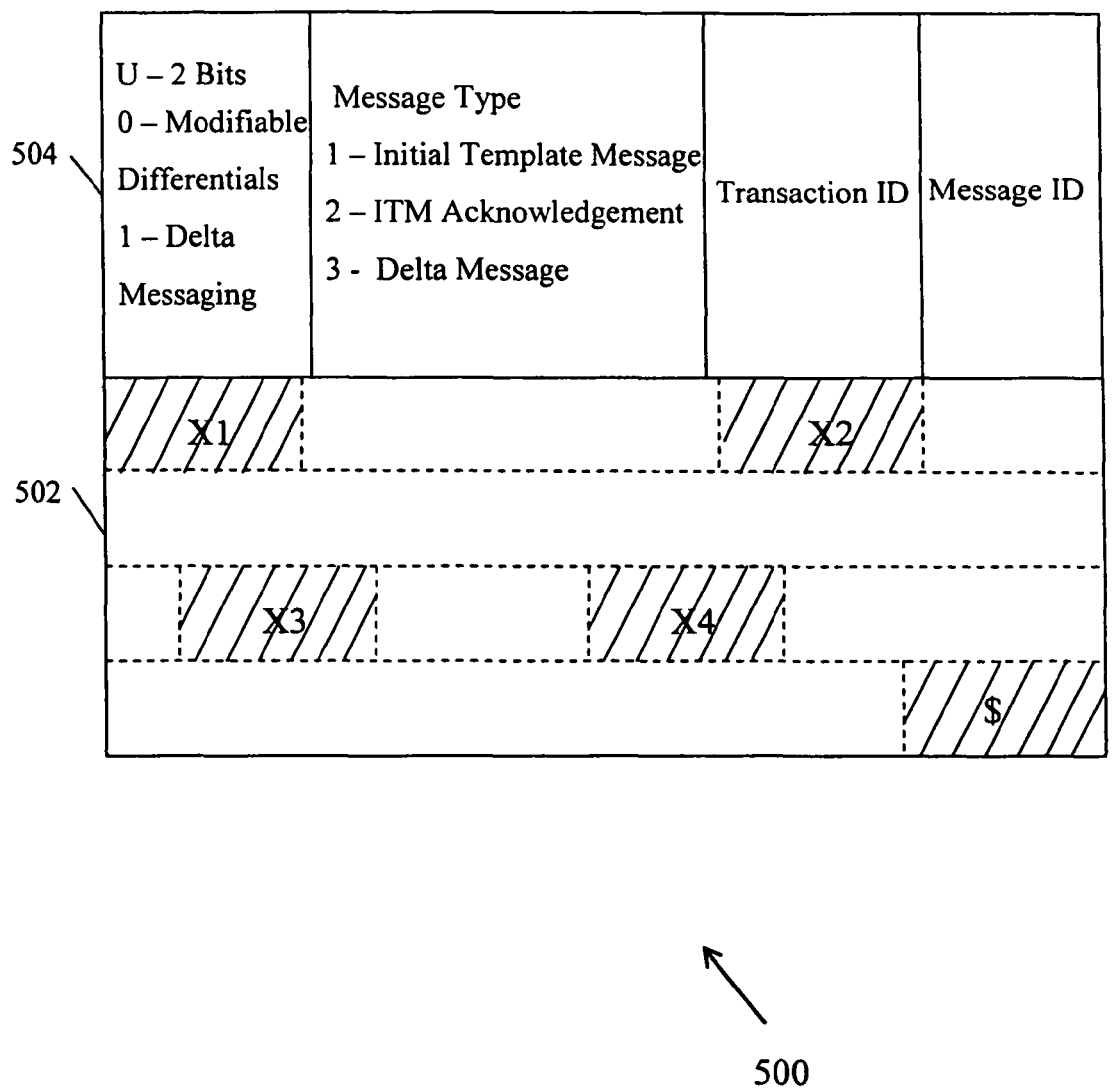
FIG. 5 illustrates an exemplary VBP delta message used in a variance based messaging method in the delta messaging mode.

FIG. 5 illustrates an exemplary VBP delta message 500 corresponding to the message 202 used in a variance based messaging method in delta messaging mode. In an embodiment of the present invention, a VBP message corresponding to a message comprises data unique to the message. With reference to FIG. 4 and FIG. 2, a new VBP message is sent corresponding to each message of the messages 202, 204, 206, and 208. An exemplary VBP delta message comprises a header element 502 and a delta message header 504 corresponding to the message 202. The header element 502 comprises the parameters unique to the message 202, i.e. X1, X2, X3, and X4. The parameter $ signifies the end of data in the exemplary VBP message 500. The delta message header 504 comprises the following sections: U, Message Type, Transaction ID and Message ID. The section 'U' is 2 bit wide and indicates the mode used in the transfer of the exemplary message 500. A '0' value for U indicates that the exemplary message 500 is transferred using the modifiable differentials mode. A '1' value for 'U' indicates that the exemplary message is transferred using the delta messaging mode. The section 'Message Type' is 8-bit wide and indicates the type of message transferred between the source and destination nodes. With reference to FIG. 4, a value '01' for 'Message Type' indicates that the message is the initial template message 402 sent from the source MSC 110 (FIG. 1) to the destination MSC 112 (FIG. 1). A value '02' for 'Message Type' indicates that the message is an acknowledgement message 404 to the initial template message 402. Further, a value '03' indicates that the message is a VBP delta message. The section 'Transaction ID' is 8-bit wide and is used for identifying the initial template message 402 by a destination node. The 'Transaction ID' is used by the destination MSC 112 (FIG. 1) for mapping an initial template message with its acknowledgement message sent to the source MSC 110. The section 'Message ID' is 8-bit wide and connects an initial template message to an associated VBP delta message. The initial template message 402 is sent with a 'Message ID' which is stored by the destination MSC 112 (FIG. 1). The VBP delta messages corresponding to the initial template message 402 are sent with the same 'Message ID' so that the destination MSC 112 (FIG. 1) can associate the VBP delta messages with the corresponding initial template message.

Figure 6A:
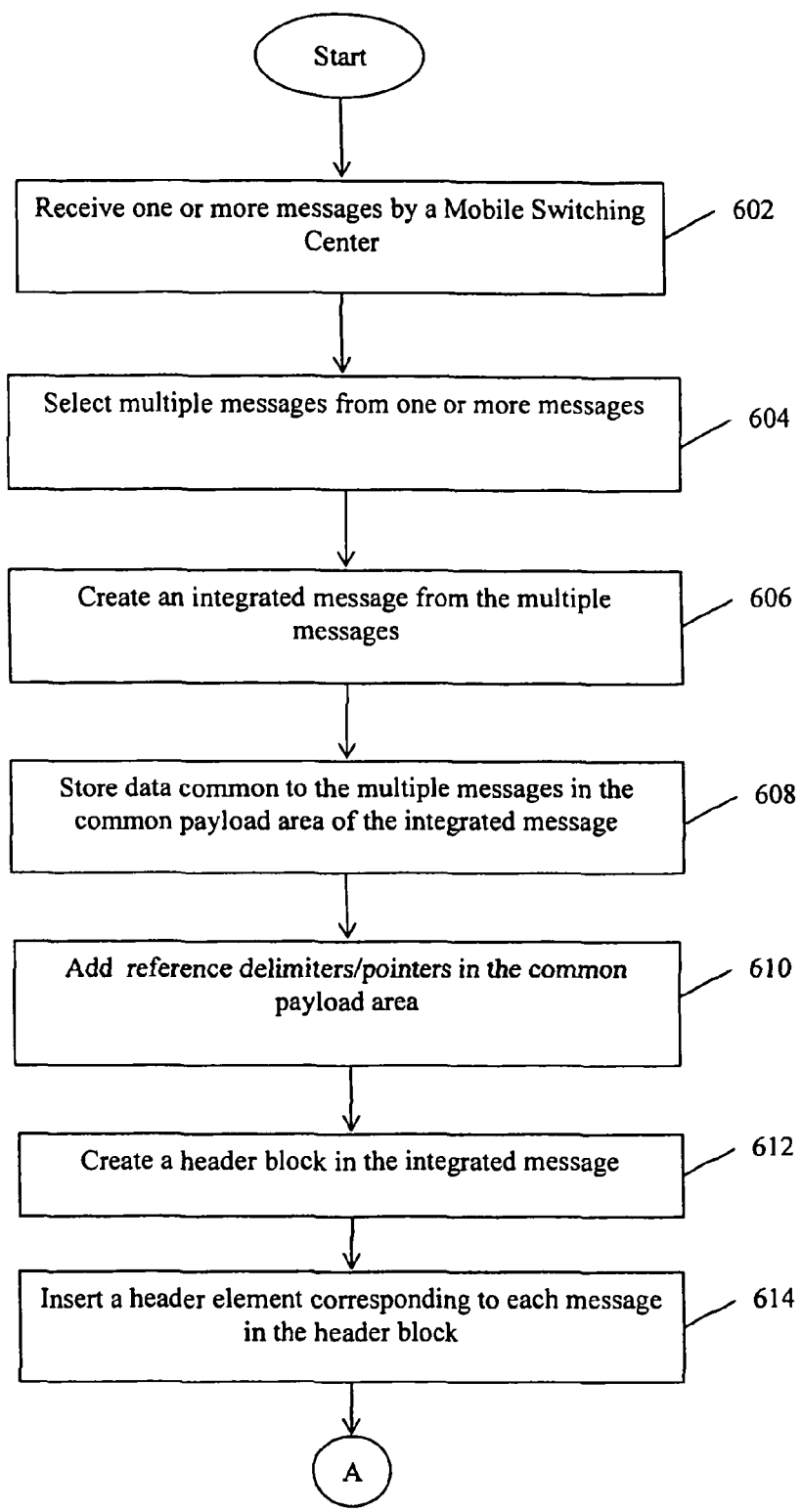
FIGS. 6A and 6B illustrate a method of transferring data in a network using variance based messaging in the modifiable differentials mode.
Figure 6B:
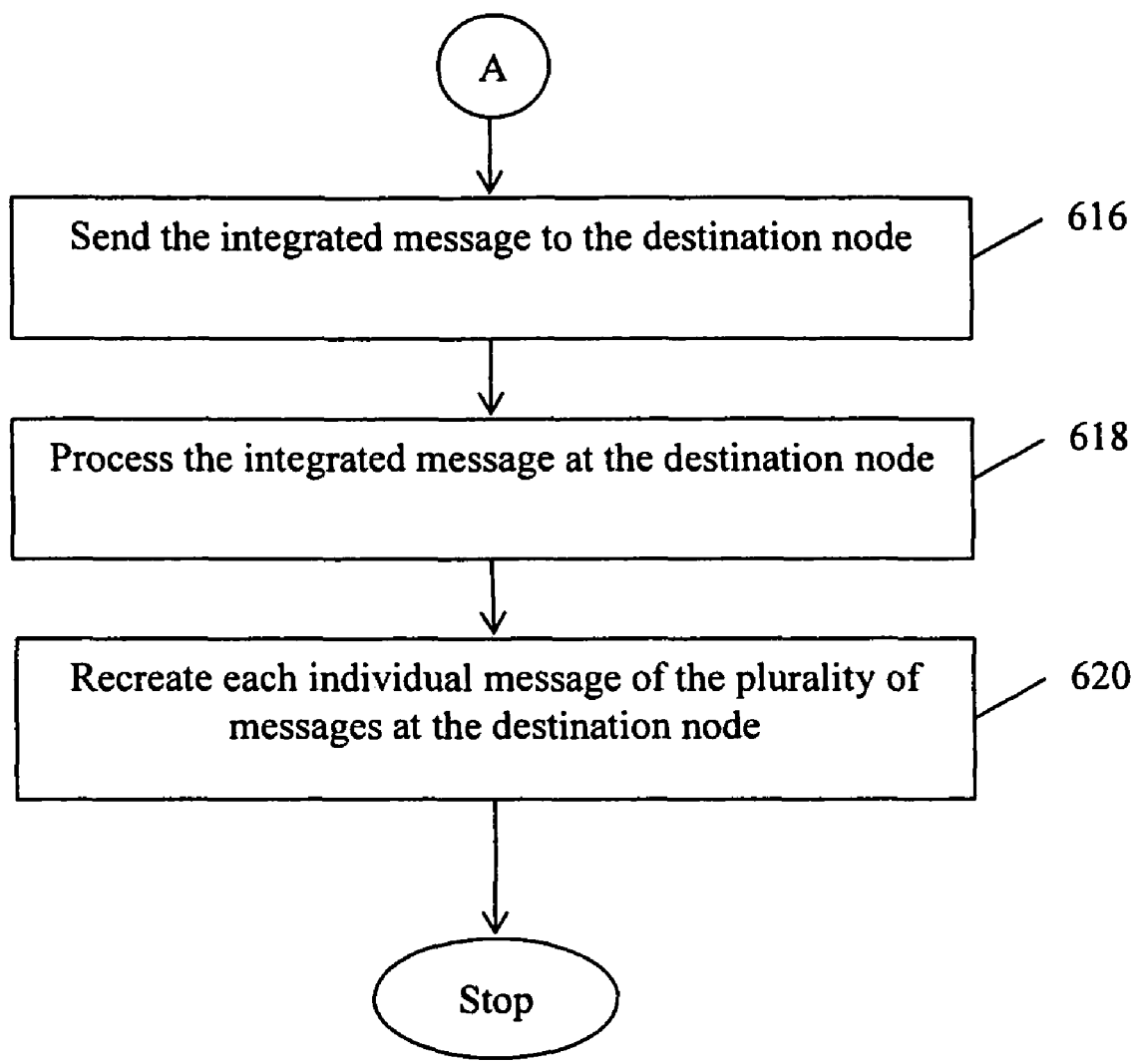

FIGS. 6A and 6B illustrate a method for transferring data in a network using variance based messaging in the modifiable differentials mode. In various embodiments of the present invention, variance based messaging using modifiable differentials mode is used for transferring data in the network in which the messages are grouped together and sent, instead of sending them individually. Examples of instances when modifiable differentials mode is used may be, if the source node is a high capacity node i.e. more number of calls are being initiated through the source node or if the multiple calls to be sent through the source node are not time sensitive.

In various embodiments of the present invention, at step 602, one or more messages are received by a Mobile Switching Center (MSC) to be sent to a destination node in a network. At step 604, multiple messages are selected from the one or more messages. The multiple messages are selected so that they can be grouped together and sent. In an embodiment of the present invention, the messages grouped together are similar with minimum variation in content.

At step 606, an integrated message is created from the multiple messages. In various embodiments of the present invention, the integrated messages comprises a common payload area, a variance based protocol header and a variance based protocol header block.

In an embodiment of the present invention, at step 608, data common to the messages to be sent is stored in the common payload area of the integrated message. At step 610, reference delimiters/pointers are added in the common payload area. The reference delimiters are numbered elements pointing to corresponding header elements in the variance based protocol header block of the integrated message. The header elements comprise data in variance to the common data corresponding to each message of the multiple messages. In an embodiment of the present invention, the reference delimiters are used in identifying and combining header elements to the common data at the destination node in order to recreate individual messages from the multiple messages.

At step 612, the variance based protocol header block is created in the integrated message. At step 614, a header element corresponding to each message of the messages is inserted in the variance based protocol header block. In an embodiment of the present invention, each header element comprises data unique to the corresponding message. At step 616 the integrated message is sent to the destination node. In an embodiment of the present invention, the integrated message is sent through an Internet Protocol (IP) network.

At step 618, after receipt of the integrated message at the destination node, the message is processed. The integrated message is processed by extracting data corresponding to each message from each header element. This is done by referencing each header element using reference delimiters in the common payload area.

At step 620, each message of the multiple messages is recreated at the destination node using the data extracted at step 618.

Figure 7A:
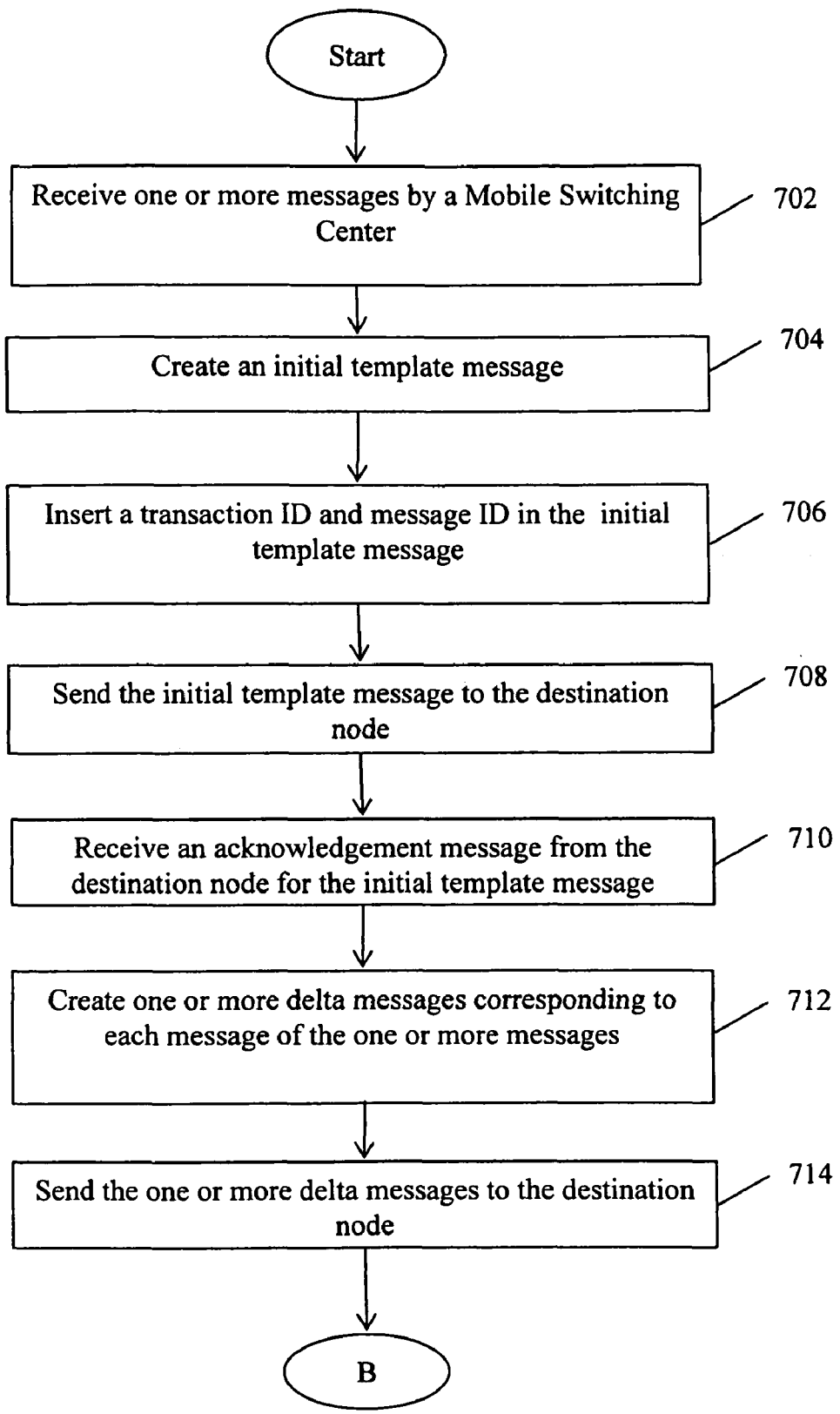
FIGS. 7A and 7B illustrate a method of transferring data in a network using variance based messaging in the delta messaging mode.
Figure 7B:
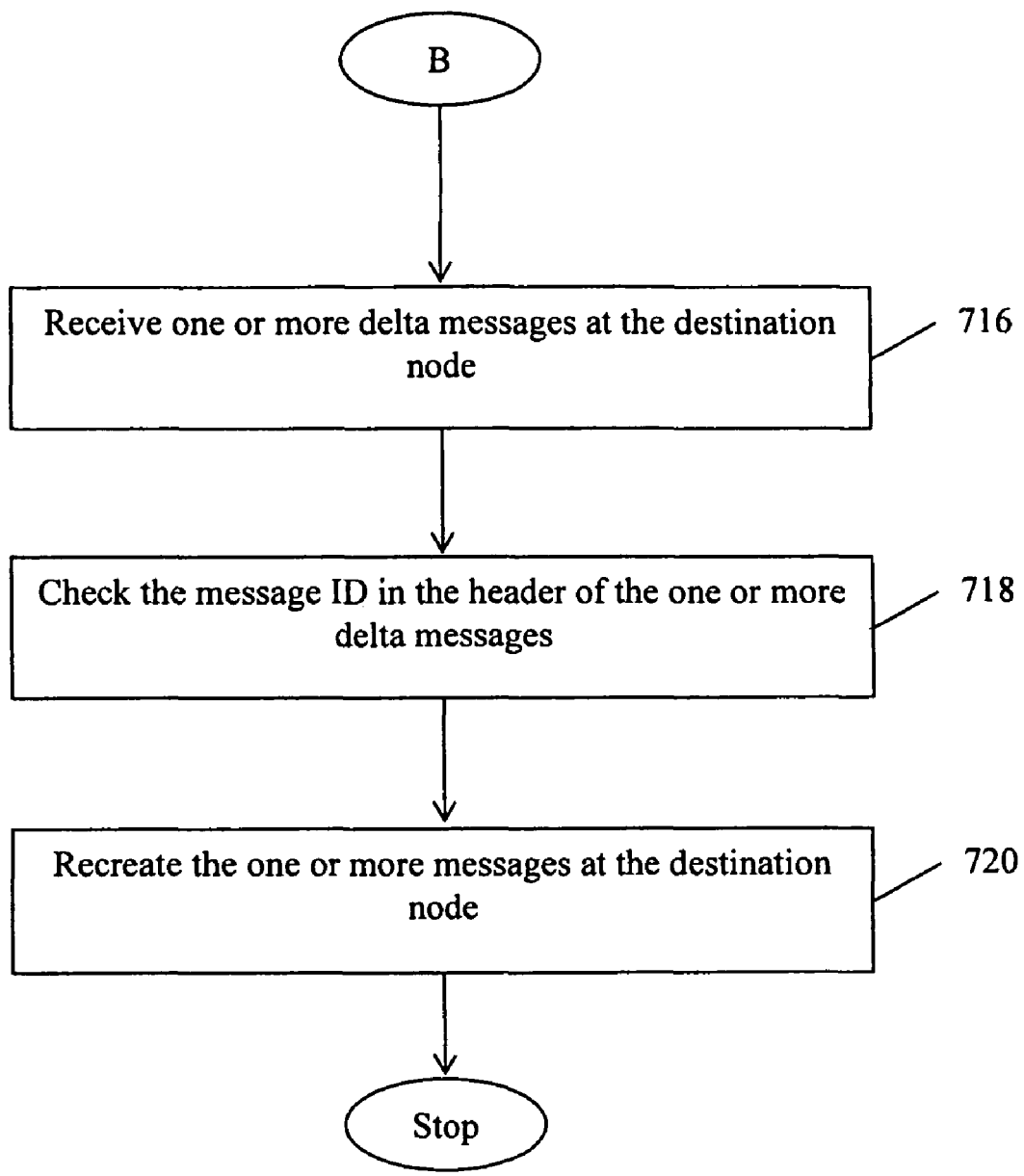

FIGS. 7A and 7B illustrate a method of transferring data in a network using variance based messaging in the delta messaging mode. In various embodiments of the present invention, variance based messaging using delta messaging mode is used for transferring data in the network in which an initial template message including data common to the messages is sent first. Subsequently, individual messages including data in variance to the common data is sent. Examples of instances when delta messaging mode is used may be, if data needs to be transferred to the destination node with minimum delay or if the source node through which the messages are being sent is a low capacity node.

In various embodiments of the present invention, at step 702, one or more messages are received by a Mobile Switching Center (MSC) to be sent to a destination node in a network. At step 704, an initial template message is created. In an embodiment of the present invention, the initial template message comprises data common to the one or more messages received by the MSC. At step 706, a transaction ID and a message ID is inserted in the initial template message. In an embodiment of the present invention, the transaction ID is used by the destination node to create an acknowledgement message and associate the initial template message with the acknowledgement message. The acknowledgement message is then sent by the destination node to the MSC as an acknowledgement that the initial template message was received correctly.

At step 708, the initial template message is sent to the destination node. In an embodiment of the present invention, the initial template message is sent through an IP network.

At step 710, the MSC receives the acknowledgement message corresponding to the initial template message. In an example, the acknowledgement message is identified by the MSC by comparing the transaction ID of the acknowledgement message with the transaction ID of the initial template message. In various embodiments of the present invention, the initial template message is cleared by the MSC within a pre-determined time.

At step 712, one or more delta messages are created corresponding to each message of the one or more messages received at the MSC. In an embodiment of the present invention, each delta message comprises data unique to the corresponding message. Each delta message is associated with the initial template message by including the message ID of the initial template message in the delta message.

At step 714, one or more delta messages are sent to the destination node individually. In various embodiments of the present invention, the initial template message created at step 704 is cleared within a pre-determined time. Hence, one or more delta messages which are associated with the initial template message are sent to the destination node within the pre-determined time.

At step 716, one or more delta messages are received by the destination node. Thereafter, at step 718, one or more delta messages are associated with the initial template message by comparing the message ID in the header of the one or more delta messages with the message ID in the initial template message.

At step 720, one or more messages are recreated at the destination node. The recreation is done by extracting data from the initial template message and the corresponding one or more delta messages.

The present invention may be implemented in numerous ways including as a system, a method, or a computer readable medium such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method for providing data transfer from a source node to a destination node in a network using variance based messaging, the method comprising the steps of:
    receiving one or more messages by the source node;
        selecting a plurality of messages to be grouped from the one or more messages, wherein the plurality of messages comprise data with minimum deviation in content;
        determining data common to all of the selected messages;
        creating an integrated message comprising a common payload area and a header block;
    creating a plurality of header elements in the header block, each header element corresponding to one of the selected messages and comprising (i) data unique to the one corresponding selected message, and (ii) a delimiter, wherein each of the header elements does not include command primitives;
    storing in the common payload area, the data common to all of the selected messages;
        sending the integrated message from the source node to the destination node; and
        recreating each message of the plurality of messages at the destination node.

2. The method of claim 1, wherein the network is a telephony network.

3. The method of claim 1, wherein the source node is a mobile switching center.

4. The method of claim 3, wherein the destination node is at least one of a mobile switching center, a base station subsystem, a database node and a bearer node.

5. The method of claim 1, wherein the one or messages are voice calls.

6. The method of claim 5 further comprising inserting a plurality of reference delimiters in the common payload area, wherein each reference delimiter points to a header element in the header block corresponding to a message of the plurality of messages.

7. The method of claim 6, wherein the step of recreating each message of the plurality of messages at the destination node further comprises the steps of:
    associating each reference delimiter with the corresponding header element in the header block; and
    extracting data from the corresponding header element and inserting the data at the common payload area to recreate each message.

8. A method for providing data transfer from a source node to a destination node in a network using variance based messaging, the method comprising the steps of:
    receiving a plurality of messages at the source node;
        determining data common to all of the received messages;
        creating a plurality of header elements in a header block, each header element corresponding to one of the plurality of messages and comprising (i) data unique to the one corresponding selected message, and (ii) a delimiter, wherein each of the header elements does not include command primitives;
        storing in the common payload area, the data common to all of the selected messages;
        creating an initial template message, comprising the data common to all of the received messages and the header block;
        sending the initial template message from the source node to the destination node;
        receiving an acknowledgement message for the initial template message from the destination node;
        a plurality of delta messages from the source node to the destination node, wherein each of the plurality of delta messages corresponds to one of the received messages and comprises data unique to the corresponding received message, wherein the plurality of delta messages do not include command primitives; and
    recreating each message of the plurality of received messages at the destination node.

9. The method of claim 8, wherein the network is a telephony network.

10. The method of claim 8, wherein the source node is a mobile switching center.

11. The method of claim 10, wherein the destination node is at least one of a mobile switching center, a base station subsystem, a database node and a bearer node.

12. The method of claim 8, wherein the one or messages are voice calls.

13. The method of claim 8 further comprising inserting a transaction identifier in the header of the initial template message before sending the initial template message to the destination node, wherein the transaction identifier is used by the destination node to associate the initial template message with the acknowledgement message.

14. The method of claim 8 further comprising inserting a message identifier in the header of the initial template message before sending the initial template message to the destination node, wherein the message identifier is used by the destination node to associate the initial template message with the plurality of delta messages.

15. The method of claim 14, wherein the step of recreating each message of the plurality of received messages at the destination node further comprises the steps of:
  associating the plurality of delta messages with the initial template message using the message identifier;
  extracting data from the plurality of delta messages; and
  combining the data extracted from the plurality of delta messages with the data from the initial template message to recreate the plurality of received messages.

16. A non-transitory computer readable storage medium having a computer readable program code embodied therein for providing data transfer from a source node to a destination node in a network using variance based messaging, the computer program product comprising:
  program instruction means for receiving one or more messages by the source node;
  program instruction means for selecting a plurality of messages to be grouped from the one or more messages, wherein the plurality of messages comprise data with minimum deviation in content;
  program instruction means for determining data common to all of the selected messages;
  program instruction means for creating an integrated message comprising a common payload area and a header block;
  program instruction means for creating a plurality of header elements in the header block, each header element corresponding to one of the selected messages and comprising (i) data unique to the one corresponding selected message, and (ii) a delimiter, wherein each header element does not include command primitives;
  program instruction means for storing in the common payload area, the data common to all of the selected messages;
  program instruction means for sending the integrated message from the source node to the destination node.

17. The computer program product of claim 16 further comprising program instruction means for inserting a plurality of reference delimiters in the common payload area, wherein each reference delimiter points to a header element in the header block corresponding to a message of the plurality of messages.

18. The computer program product of claim 17, wherein the program instruction means for recreating each message of the plurality of messages at the destination node further comprises:
  program instruction means for associating each reference delimiter with the corresponding header element in the header block; and
  program instruction means for extracting data from the corresponding header element and inserting the data at the common payload area to recreate each message.

19. A non-transitory computer readable storage medium having a computer readable program code embodied therein for providing data transfer from a source node to a destination node in a network using variance based messaging, the computer program product comprising program instruction means for receiving a plurality of at the source node;
  program instruction means for determining data common to all of the received messages;
  program instruction means for creating an initial template message, comprising the data common to all of the received messages;
  program instruction means for sending the initial template message from the source node to the destination node;
  program instruction means for receiving an acknowledgement message for the initial template message from the destination node;
  a plurality of delta messages from the source node to the destination node, wherein each of the plurality of delta messages corresponds to one of the received messages and comprises data unique to the corresponding received message, wherein the delta message does not include command primitives; and
  program instruction means for recreating each message of the plurality of received messages at the destination node.

20. The computer program product of claim 19 further comprising program instruction means for inserting a transaction identifier in the header of the initial template message before sending the initial template message to the destination node, wherein the transaction identifier is used by the destination node to associate the initial template message with the acknowledgement message.

21. The computer program product of claim 19 further comprising program instruction means for inserting a message identifier in the header of the initial template message before sending the initial template message to the destination node, wherein the message identifier is used by the destination node to associate the initial template message with the plurality of delta messages.

22. The computer program product of claim 21, wherein program instruction means for recreating each message of the plurality of received messages at the destination node further comprises:
  program instruction means for associating the plurality of delta messages with the initial template message using the message identifier;
  program instruction means for extracting data from the plurality of delta messages; and
  program instruction means for combining the data extracted from the plurality of delta messages with the data from the initial template message to recreate the plurality of received messages.

* * * * *

UNITED STATES PATENT AND TRADEMARK OFFICE
CERTIFICATE OF CORRECTION

PATENT NO. : 8,160,060 B2  Page 1 of 1
APPLICATION NO. : 12/319183
DATED : April 17, 2012
INVENTOR(S) : Rajmohan Harindranath It is certified that error appears in the above-identified patent and that said Letters Patent is hereby corrected as shown below:

On the Title page, Item [57] Abstract, line 5, "messaging is provided" should
  read --messaging are provided--

In the Specification
Column 1, line 35, "causes" should read --cause--
Column 2, line 43, "equipments" should read --equipment--
Column 2, line 51, "provides" should read --provide--
Column 2, line 56-57, "provides" should read --provide--
Column 2, line 59, "message" should read --messages--
Column 3, line 7, "is" should read --are--
Column 3, line 56, "include" should read --include,--
Column 4, line 13, "include" should read --include,--
Column 4, line 20, "include" should read --include,--
Column 4, line 25, "include" should read --include,--
Column 7, line 65, "comprises" should read --comprise--

In the Claims
Column 10, line 6, Claim 5, "or messages" should read --or more messages--
Column 10, line 58, Claim 12, "or messages" should read --or more messages--
Column 12, line 6, Claim 19, "of at" should read --of messages at--

Signed and Sealed this
Seventeenth Day of September, 2013

Teresa Stanek Rea
*Deputy Director of the United States Patent and Trademark Office*